United States Patent
Yonezawa et al.

(10) Patent No.: US 6,989,110 B2
(45) Date of Patent: Jan. 24, 2006

(54) ELECTROCONDUCTIVE PASTE AND METHOD OF PRODUCING THE SAME

(75) Inventors: Minoru Yonezawa, Omihachiman (JP); Shin Iwasaki, Shiga-ken (JP)

(73) Assignee: Murata Manufacturing Co., Ltd., (JP)

( * ) Notice: Subject to any disclaimer, the term of this patent is extended or adjusted under 35 U.S.C. 154(b) by 1 day.

(21) Appl. No.: 10/849,130

(22) Filed: May 20, 2004

(65) Prior Publication Data

US 2004/0251449 A1 Dec. 16, 2004

(30) Foreign Application Priority Data

Jun. 13, 2003 (JP) .............................. 2003-168976

(51) Int. Cl.
   *H01B 1/22* (2006.01)
   *B32B 15/00* (2006.01)
(52) U.S. Cl. .................................................... 252/512
(58) Field of Classification Search ................ 252/512, 252/513, 514; 427/96.1, 97.1
   See application file for complete search history.

(56) References Cited

U.S. PATENT DOCUMENTS 5,011,627 A * 4/1991 Lutz et al. ................... 252/512
5,647,901 A * 7/1997 Brown ........................ 106/311

FOREIGN PATENT DOCUMENTS

| JP | 07-021832 | 1/1995 |
| JP | 07-021833 | 1/1995 |

* cited by examiner

*Primary Examiner*—Mark Kopec
(74) *Attorney, Agent, or Firm*—Dickstein, Shapiro, Morin & Oshinsky, LLP.

(57) ABSTRACT

Electroconductive paste includes electroconductive powder of Ni, Cu or the like, a first binder resin such as ethyl cellulose resin or the like, a fatty acid which is solid at ordinary temperature (20 to 25° C.), and solvents. The solvents include a cyclic compound type solvent capable of dissolving the first binder resin, an aliphatic hydrocarbon type solvent incapable of dissolving a second binder resin such as butyral resin or the like contained in a ceramic green sheet, and an aromatic hydrocarbon type solvent incapable of dissolving the second binder resin.

20 Claims, No Drawings

ELECTROCONDUCTIVE PASTE AND METHOD OF PRODUCING THE SAME

BACKGROUND OF THE INVENTION

1. Field of the Invention

The present invention relates to an electroconductive paste and a method of producing the same and, in particular, to an electroconductive paste for forming internal electrodes in a laminated ceramic electronic part such as a laminated ceramic capacitor or the like.

2. Description of the Related Art

In recent years, the size of electronic devices have been decreased. Thus, a reduction in size of the electronic parts has needed to also rapidly progress. Correspondingly, a reduction of the thickness of ceramic layers has been also required in the field of laminated ceramic electronic parts, requiring a reduction in the thickness of the green sheets which are fired during formation of ceramic layers. Moreover, the capacity of capacitors in the field of laminated ceramic capacitors has increased. Thus, there has been intensive demand for reduction in thickness of ceramic green sheets.

Ordinarily, an electroconductive paste for forming internal electrodes is printed onto ceramic green sheets by screen printing in production of laminated ceramic electronic parts such as laminated ceramic capacitors or the like. Then the ceramic green sheets are laminated, and the ceramic laminate is fired.

The ceramic green sheets are formed by forming ceramic slurry into a sheet by the doctor blade method or the like. The ceramic slurry is formed by mixing a binder resin and an organic solvent are mixed with ceramic raw material powder. Thus, a ceramic green sheet is formed. The electroconductive paste is produced by dispersing an electroconductive powder in an organic vehicle containing a binder resin and a solvent.

However, so-called sheet-attack problems occur during production of laminated ceramic electronic parts. In particular, the solvent contained in the electroconductive paste dissolves the binder resin contained in the ceramic green sheet, so that the ceramic green sheet swells and is dissolved. This "sheet-attack" defect exerts an severe influence over the formation of thin layers of the ceramic green sheets.

Therefore, it has been proposed that hydrogenated terpineol acetate be used as a solvent in the electroconductive paste (see Japanese Unexamined Patent Application Publication No. 7-21833 (Patent Document 1)).

However, a further reduction in layer-thickness of ceramic green sheets has been required in recent years. Even if the electroconductive paste as described in Patent Document 1 is used, the "sheet-attack" problem can not be sufficiently prevented, and laminated ceramic electronic parts formed by use of the ceramic green sheets are distorted or cracked.

SUMMARY OF THE INVENTION

In view of the foregoing, the present invention has been devised. An object of the present invention is to provide electroconductive paste with which the "sheet attack" defect can be suppressed and to provide a method of producing the same.

According to the present invention, there is provided electroconductive paste for forming an electroconductive pattern on a ceramic formed piece containing a binder resin, which includes: electroconductive powder; a first binder resin; and plural solvents, the plural solvents including a first solvent essentially consisting of a cyclic compound type solvent capable of dissolving the first binder resin, a second solvent essentially consisting of an aliphatic hydrocarbon type solvent incapable of dissolving the binder in the ceramic ("second binder resin"), and a third solvent essentially consisting of an aromatic hydrocarbon type solvent incapable of dissolving the second binder resin. With the electroconductive paste of the present invention, the sheet-attack problems can be prevented. Moreover, the electroconductive paste has high storage stability due to the aromatic hydrocarbon as a solvent component.

Preferably, the electroconductive paste further includes a fatty acid which is solid at room temperature.

In the case where the layer thickness of a ceramic green sheet is reduced, and the number of laminated ceramic green sheets is increased, internal electrodes tend to peel from the ceramic layers at the end faces of the fired ceramic laminate. That is, so-called delamination easily occurs. According to the present invention, the fatty acid which is solid at room temperature becomes liquid when the ceramic formed piece is produced, and flows into the ceramic formed piece. At room temperature, the fatty acid returns to the solid state, or the adhesion is increased by press-bonding. Thus, bonding between internal electrodes and the ceramic layers in the endfaces is enhanced. Thus, so-called delamination in the end-faces can be effectively prevented by the addition of the solid fatty acid to the electroconductive paste.

Preferably, the fatty acid includes at least one of stearic acid, lauric acid, myristic acid, palmitic acid, behenic acid, benzoic acid and sebacic acid.

Preferably, the first binder resin includes a cellulose derivative.

The cellulose derivative may be cellulose ether, cellulose ester or their mixture.

Preferably, the cellulose ether includes at least one of ethyl cellulose, carboxymethyl cellulose, hydroxyethyl cellulose, hydroxypropyl cellulose, methyl cellulose, methyl hydroxyethyl cellulose and carboxymethyl ethyl cellulose.

Preferably, the cellulose ester includes at least one of cellulose acetate and cellulose acetobutyrate.

Preferably, the second binder resin includes at least one of polyvinylacetate type resins, acrylic resins, and butyral type resins.

Preferably, the first binder resin is ethyl cellulose type resin, and the second binder resin is butyral type resin. In this case, the advantages of the present invention can be securely obtained.

Preferably, the plural types of solvents include about 30 to 70% by weight of the first solvent, about 10 to 60% by weight of the second solvent, and about 1 to 20% by weight of the third solvent.

Preferably, the first solvent includes at least one of dihydroterpineol, dihydroterpinyl acetate and terpineol.

Preferably, the second solvent includes a mineral oil having about 7 to 20 carbon atoms.

Preferably, the third solvent includes at least one of methyl decalin, amyl benzene, and isopropyl benzene.

Also, according to the present invention, there is provided a method of producing electroconductive paste which contains electroconductive powder, first binder resin, and plural solvents, and is to form an electroconductive pattern on a ceramic formed piece, which includes the steps of: preparing a first solvent essentially consisting of a cyclic compound type solvent capable of dissolving the first binder resin, a second solvent essentially consisting of an aliphatic hydrocarbon type solvent incapable of dissolving the second binder resin, and a third solvent essentially consisting of an aromatic hydrocarbon type solvent incapable of dissolving the second binder resin; mixing the first solvent, the second solvent and the third solvent to produce a mixed solvent; mixing the electroconductive powder, the first binder resin the mixed solvent, and a dilution solvent to produce slurry with a viscosity of not more than about 10 mPa·s; and removing the dilution solvent from the slurry.

Thus, an electroconductive paste having an appropriate paste viscosity can be produced without excessive crushing and strong adhesion to the resin, by setting the slurry viscosity not more than about 10 mPa·s in the production process of the electroconductive paste. Accordingly, when the electroconductive paste is used to form an electroconductive pattern on the ceramic green sheet, printing deficiencies such as scratches in the electroconductive pattern or the like can be prevented or retarded. Thus, superior printing properties can be secured.

DESCRIPTION OF THE PREFERRED EMBODIMENTS

Hereinafter, an embodiment of the present invention will be described in detail.

The electroconductive paste of the present invention contains electroconductive powder, a first binder resin, and plural solvents. The electroconductive paste of the present invention is used for formation of an electroconductive pattern on a ceramic formed piece containing a second binder resin.

As electroconductive powder, a metallic powder of Ni, Cu, Ag, Pd or the like may be used.

As the first binder resin, a cellulose derivative may be used. As a cellulose derivative, cellulose ethers, cellulose esters or mixtures of them may be used.

As the cellulose ether, at least one resin of ethyl cellulose, carboxymethyl cellulose, hydroxyethyl cellulose, hydroxypropyl cellulose, methyl cellulose, methyl hydroxyethyl cellulose and carboxymethyl ethyl cellulose may be used.

As cellulose ester, at least one resin of cellulose acetate, cellulose butyrate, and cellulose acetobutyrate may be used.

The plural solvents include a first solvent essentially consisting a cyclic compound type solvent capable of dissolving the first binder resin, a second solvent essentially consisting of an aliphatic hydrocarbon type solvent incapable of dissolving the second binder, and a third solvent essentially consisting of an aromatic hydrocarbon type solvent incapable of dissolving the second binder resin.

The first solvent is contained in the electroconductive paste mainly to dissolve the first resin. As a first resin, at least one solvent of dihydroterpineol, dihydroterpinyl acetate and terpineol can be used.

In the plural solvents, preferably, the content of the first solvent is in the range of about 30 to 70% by weight, If the content is less than about 30% by weight, the first binder resin in the electroconductive paste can not be sufficiently dissolved in some cases. On the other hand, if the content exceeds about 70 by weight, the "sheet-attack" defect will occur.

The second solvent is contained in the electroconductive paste mainly to prevent the "sheet-attack" defect. As the second solvent, a mineral oil having about 7 to 20 carbon atoms may be used.

In the plural solvents, preferably, the content of the second solvent is in the range of about 10 to 60% by weight. If the content is less than about 10% by weight, the sheet-attack defect will occur. On the other hand, if the content exceeds about 60% by weight, the first binder resin in the electroconductive paste can not be sufficiently dissolved in some cases.

The third solvent is contained in the electroconductive paste mainly to ensure the storage stability of the electroconductive paste. As a third solvent, at least one of methyl decalin, amyl benzene and isopropyl benzene may be used.

In the plural solvents, preferably, the content of the third solvent is in the range of about 1 to 20% by weight. If the content is less than about 1% by weight, the time-dependent stability of the electroconductive paste may be deteriorated. On the other hand, if the content exceeds about 20% by weight, the first binder resin can not be sufficiently dissolved in the electroconductive paste in some cases.

Moreover, preferably, the electroconductive paste of the present invention contains a fatty acid which is solid at room temperature (about 20 to 25° C.). The reason is described below.

In the production process for a laminated ceramic electronic part, ceramic green sheets having an electroconductive paste printed thereon are laminated. The laminated ceramic green sheets are press-bonded to each other, e.g., at a temperature of about 90° C., and cut into a predetermined size. Thus, a ceramic laminate is formed. In this case, as described above, the fatty acid is contained in the electroconductive paste, which is solid at ordinary temperature and has a melting point lower than the temperature at which the press-bonding is carried out. Thereby, the fatty acid is melted during the press-bonding so as to be dissolved into the ceramic green sheet. When the ceramic green sheet regains room temperature again, the fatty acid is solidified. Thus, the bonding between the ceramic green sheet and the electroconductive paste can be enhanced.

If thin ceramic green sheets are laminated and press-bonded, an applied electroconductive paste tends to peel off from the ceramic green sheets at the end faces of the ceramic laminate. Thus, delamination easily occurs. On the other hand, if the solid fatty acid is contained in the electroconductive paste, the delamination in the end faces can be effectively prevented.

Even if the melting point of the fatty acid is higher than the press-bonding temperature, the bonding-strength between the ceramic green sheets and the electroconductive paste can be increased since the fatty acid is plastically deformed so that the electroconductive paste and the ceramic green sheets compactly adhere closely to each other.

As the fatty acid which is solid at ordinary temperature as described above, stearic acid (melting point: 69.0° C.), lauric acid (melting point: 44.2° C.), myristic acid (melting point: 53.9° C.), palmitic acid)melting point: 63.1° C.), behenic acid (melting point: 79.9° C.), sebacic acid (melting point; 134.0° C.) and benzoic acid (melting point; 121.0 to 124.0° C.) may be used.

Preferably, the content of the fatty acid in the electroconductive paste is in the range of about 0.05 to 1.0% by weight. If the content is less than about 0.05% by weight, the adhesion between the ceramic green sheets and the electroconductive paste can not be significantly enhanced. On the other hand, if the content exceeds about 1.0% by weight, the first and second binders can not be sufficiently removed in the binder-removal process and delamination between them easily occurs.

Moreover, preferably, the ratio by weight of the contents of the first binder resin and the plural solvents is in the range of about 1:99 to 50:50. Moreover, the ratio by weight of the content of the organic vehicle containing the first binder and the plural solvents to that of the electroconductive powder is in the range of about 20:80 to 90:10.

As a second binder resin contained in the ceramic formed piece, at least one of polyvinylacetate type resins, acrylic type resins and butyral type resins may be used.

Especially in the case where an ethyl cellulose type resin is used as a first binder resin and a butyral type resin is used as a second binder resin, the advantages of the present invention can be securely obtained.

Hereinafter, a method of producing the electroconductive paste will be described.

First, the first solvent, the second solvent, and the third solvent are mixed at a predetermined mixing ratio by weight. Thus, a mixed solvent is prepared. Then, the first binder resin is gradually added to the mixed solvent, and sufficiently stirred. Thus, an organic vehicle is produced in which the mixed solvent and the first binder resin are contained at a predetermined ratio by weight. A fatty acid which is solid at ordinary temperature is contained in the mixed solvent, if necessary.

Subsequently, the electroconductive powder, the organic vehicle, and a dilution solvent such as acetone or the like are weighed out in predetermined amounts, mixed, and sufficiently dispersed by means of a sand mill. Thus, slurry with a viscosity of not more than about 10 mPa·s is prepared.

If the slurry viscosity exceeds about 10 mPa·s, the viscosity of electroconductive paste, which is a final product, becomes large, since crushing is excessively carried out, the adsorption to the resin is strong, and so forth. As a result, when the electroconductive paste is screen-printed on a ceramic green sheet, the electroconductive pattern is scratched and so forth. Thus, the printing properties of the electroconductive paste are deteriorated. If the slurry viscosity is excessively low, the electroconductive powder tends to precipitate. Thus, it is difficult to handle the slurry. Accordingly, it is estimated that for practical use, the lower limit of the slurry viscosity is about 3 mPa·s.

Thereafter, acetone contained in the slurry is evaporated off and the electroconductive paste is produced.

According to this embodiment, the electroconductive paste contains the first solvent, the second solvent and the third solvent. Thus, the "sheet-attack" defect can be suppressed, and the electroconductive paste has a superior storage stability. Moreover, the electroconductive paste contains a fatty acid which is solid at ordinary temperature, if necessary. Thus, delamination at the end-faces of the fired ceramic laminate can be suppressed.

Moreover, the viscosity of the slurry is adjusted to be not more than about 10 mPa·s for the dispersion in the production process of the electroconductive paste. Therefore, excess crushing or strong adsorption to the resin can be prevented. Thus, a paste having a suitable viscosity can be obtained. In the case where the electroconductive paste is used to form an electroconductive pattern on the ceramic green sheet, the paste exhibits superior printing properties without printing deficiencies such as scratches in the electroconductive pattern or the like.

EXAMPLES

Hereinafter, examples according to the present invention will be described.

Example 1

Solvent having compositions shown in Table 1 were prepared.

TABLE 1

|  |  | Type of solvent | | | | Content ratio |
| --- | --- | --- | --- | --- | --- | --- |
|  |  | Solvent A | Solvent B | Solvent C | Solvent D | (weight ratio) |
| Example | 1 | Dihydroterpineol | Heptamethylnonane | Methyl decalin | — | A:B:C = 60:36:4 |
|  | 2 | Dihydroterpinyl acetate | Dodecane | Amyl benzene | — | A:B:C = 60:36:4 |
|  | 3 | Terpineol | Heptane | Isopropyl benzene | — | A:B:C = 60:36:4 |
| Comparative example | 1 | Dihydroterpineol | — | — | — | — |
|  | 2 | — | Heptamethylnonane | — | — | — |
|  | 3 | — | — | — | Octyl alcohol | — |
|  | 4 | Dihydroterpineol | Heptamethylnonane | — | — | A:B = 60:40 |
|  | 5 | — | Heptamethylnonane | Methyl decalin | Octyl alcohol | D:B:C = 60:36:4 |

That is, in Example 1, as solvent A (first solvent: cyclic compound type solvent) dihydroterpineol was used. As solvent B (second solvent: aliphatic hydrocarbon type solvent), heptamethyl nonane with a carbon number of 16 was used. As solvent C (third solvent: aromatic hydrocarbon type solvent), methyl decalin was used. Thus, the mixed solvent was prepared of which the content ratio by weight of the solvents A, B, and C was 80:36:4.

In Example 2, as solvent A, dihydroterpineol acetate, as solvent B, dodecane with a carbon number of 12, and as solvent C, amyl benzene were used, respectively. Thus, a mixed solvent with a content ratio similar to that of Example 1 was prepared.

Moreover, in Example 3, as solvent A, terpineol, as solvent B, heptane with a carbon number of 7, and as solvent C, isopropyl benzene were used. Thus, a mixed solvent with a content ratio similar to that of Example 1 was prepared.

Moreover, in Comparative Example 1, a solvent consisting of dihydroterpineol (solvent A) only was prepared. In Comparative Example 2, a solvent consisting of heptamethyl nonane with a carbon number of 16 (solvent B) was prepared. In Comparative Example 3, octyl alcohol as an aliphatic type higher alcohol solvent (hereinafter, referred to as solvent D) was prepared.

In Comparative Example 4, dihydroterpineol (solvent A) and heptamethyl nonane with a carbon number of 16 (solvent B) were used to form a mixed solvent of which the content ratio by weight of the solvents A and B was 60:40.

In Comparative Example 5, octyl alcohol (solvent D), heptamethyl nonane with a carbon number of 16 (solvent B), and methyl decalin (solvent C) were used to prepare a mixed solvent of which the content ratio by weight of the solvents D, B and C was 60:36:4.

Subsequently, an ethyl cellulose type resin as a first binder resin was gradually added to the solvents of the respective Examples and Comparative Examples, and was stirred with a stirrer for 24 hours. Thus, organic vehicles with a content ratio by weight of the solvents and the ethyl cellulose type resin of 94:6 were prepared.

Next, it was confirmed whether the ethyl cellulose type resin was dissolved in each organic vehicle. The organic vehicle of Comparative Example 2 did not contain either solvent A or D which can dissolve the ethyl cellulose type resin and therefore, the ethyl cellulose type resin was not dissolved in the organic vehicle of Comparative Example 2. On the other hand, the ethyl cellulose type resin was dissolved in the organic vehicles of the other examples and comparative examples, which contained solvent A or D capable of dissolving the ethyl cellulose type resin.

Moreover, the organic vehicles of the examples and the comparative examples were left to stand for two months at room temperature for the examination of storage stability. Separation occurred in the organic vehicle of Comparative Example 4, containing the solvent C but not solvents A and B. That is, it was found that the solvent C combined with the solvents A and B contributes to the high storage stability of the organic vehicle.

Next, a ceramic slurry containing barium titanate as a main component and a butyral type resin as a second resin binder was prepared in a known method. Thereafter, the slurry was formed by the doctor blade method to produce a ceramic green sheet. In particular, the ceramic slurry was cast on a carrying film made of polyethylene terephthalate while the thickness was adjusted by means of a blade. Thus, a ceramic green sheet was formed.

Next, the organic vehicles of Examples 1 to 3 and Comparative Examples 1, 3 and 5, which exhibited high storage stability, were put on the ceramic green sheet. It was visually checked whether sheet-attack defects would occur or not.

As a result, the anti-sheet-attack properties of Examples 1 to 3 were superior. On the other hand, sheet-attack defects were observed in Comparative Examples 1, 3 and 5.

In Examples 1 to 3 showing the superior anti-sheet-attack properties, the ceramic green sheets could be sufficiently released from the carrying films. On the other hand, in Comparative Examples 1, 3 and 5, it was difficult to release the ceramic green sheets from the carrying films.

As seen in the above-description, the solvents used in Comparative Examples 1 to 5 were inferior for use in the electroconductive paste to form the internal electrodes of a laminated ceramic electronic part.

Table 2 shows the test results of the storage stabilities (dissolution of binder) and the anti-sheet-attack properties of the organic vehicles in the examples and comparative Examples.

TABLE 2

|  |  | Solubility for binder | | Anti-sheet- |
|---|---|---|---|---|
|  |  | Initial | After 2 months | attack property |
| Example | 1 | Dissolved | Dissolved | Superior |
|  | 2 | Dissolved | Dissolved | Superior |
|  | 3 | Dissolved | Dissolved | Superior |

TABLE 2-continued

|  |  | Solubility for binder | | Anti-sheet- |
|---|---|---|---|---|
|  |  | Initial | After 2 months | attack property |
| Comparative example | 1 | Dissolved | Dissolved | Inferior |
|  | 2 | Insoluble | Insoluble | could not be measured |
|  | 3 | Dissolved | Dissolved | Inferior |
|  | 4 | Dissolved | Dissolved | Could not be measured |
|  | 5 | Dissolved | Dissolved | Inferior |

The solvent in Comparative Example 2, which consisted of the solvent B only, could not dissolve the ethyl cellulose type resin. In Comparative Examples 1, 3, 4, and 5, the solvent did not contain one of solvents A, B and C, and thus, were unsuitable for use in electroconductive paste to form internal electrodes.

On the other hand, the solvents in Examples 1 to 3 contained all of the solvents A, B and C as solvent components. It was shown that the electroconductive pastes had superior storage stabilities and the sheet-attack defects could be prevented.

Example 2

In Example 2, the same solvent as in Example 1 was used. 100 parts by weight of the solvent, 250 parts by weight of acetone, 42 parts by weight of Ni powder and 58 parts by weight of an organic vehicle were mixed. Thereafter, the mixture was placed in a sand mill with a capacity of 0.6 L, and was dispersed for 60 minutes to form slurry. The viscosity of the slurry was measured with a BL type viscometer (manufactured by TOKI SANGYO CO., LTD.).

Next, similarly to Example 1, the acetone was evaporated off by means of a planetary mixer equipped with a pressure-reducing device. An electroconductive paste containing 42% by weight of the Ni powder and 58% by weight of the organic vehicle was thus prepared, and taken as Example 11.

Electroconductive paste of Comparative Examples 11 and 12 were prepared in the same manner as that in Example 11 except that the contents of acetone were 30 parts by weight and 110 parts by weight based on 100 parts by weight of the solvent, respectively.

Subsequently, the viscosities of the pastes in Example 11 and Comparative Examples 11 and 12 were measured with a BL type viscometer (manufactured by TOKI SANGYO CO., LTD.). Thereafter, the electroconductive paste was screen-printed onto a ceramic green sheet containing barium titanate as a major component and the butyral type resin as a second binder resin. The printing properties were checked.

Table 3 shows the slurry viscosities, the paste viscosities and the printing properties of the slurries or paste of the examples and the comparative Examples.

TABLE 3

|  |  | Acetone (parts by weight) | Slurry viscosity (mPa · s) | Paste viscosity (Pa · s) | Printing property |
|---|---|---|---|---|---|
| Example | 11 | 250 | 10 | 9 | Good |
| Comparative example | 11 | 30 | 240 | 28 | Scratches |
|  | 12 | 110 | 294 | 30 | Scratches |

As seen in Table 3, the slurry viscosities were large in Comparative Examples 11 and 12, i.e., 240 mPa·s and 294 mPa·s. The paste viscosities were large, i.e., 28 Pa·s and 30 Pa·s. Scratches were formed in the electroconductive patterns and the printing properties were inferior.

On the other hand, in Example 11, the slurry viscosity was low, i.e., 10 mPa·s and the paste viscosity was appropriately low. i.e., 9 Pa·s. No scratches were generated. The printing property was superior.

Example 3

In Example 3, the same solvent as that in Example 1 was used. 250 parts by weight of acetone was added based on 100 parts by weight of the solvent. Moreover, 0.05 to 1.2 parts by weight of fatty acids (stearic acid with a melting point 70.5° C., lauric acid with a melting point of 44.2° C., sebacic acid with a melting point 134° C., and oleic acid with a melting point of 13.3° C.) were added, and dispersed for 60 minutes by means of a sand mill with a capacity of 0.6 L.

Subsequently, 42 parts by weight of the Ni powder and 58 parts by weight of the organic vehicle were added to the above-described mixture, and dispersed for 5 hours by means of the sand mill. Thereafter, the acetone was removed by fractional distillation. Thus, electroconductive paste was obtained.

On the other hand, 50% by weight of barium titanate type ceramic powder, 10% by weight of butyral type resin and 40% by weight of a solvent such as ethanol, toluene or the like, were mixed and wet-crushed for 3 hours by means of the sand mill to form slurry. The slurry was formed into a ceramic green sheet on a carrying film by the doctor blade method.

Subsequently, the electroconductive paste was screen-printed on the surface of the ceramic green sheet. Plural ceramic green sheets having the electroconductive patterns formed thereon were laminated in such a manner that the electroconductive patterns were arranged in a predetermined direction. Then, the laminate was sandwiched between ceramic sheets having no electroconductive patterns, pressed and bonded to each other at a temperature of 90° C., and cut in a predetermined size. Thus, a ceramic laminate was prepared. The ceramic laminate, after degreasing, was fired at a temperature of 1200° C. to 1300° C. for 2 to 3 hours in a reducing atmosphere containing $N_2$ and $H_2$. Thus, the ceramic sintered pieces of Examples 21 to 28 and Comparative Examples 21 and 22 were obtained.

Moreover, a ceramic sintered piece having no fatty acid was prepared in the same manner as described above, and was taken as Comparative Example 23.

Next, the ten-point average roughnesses Rz of the examples and the comparative examples were determined. The end-faces of 1500 samples of each of the examples and comparative examples were observed with a scanning electron microscope (SEM). The number of samples in which the end faces had peeled was counted.

Table 4 shows the types, contents, and melting points of the fatty acids used in the examples and comparative examples, and the measurement results.

TABLE 4

| | | Fatty acid | Content (% by weight) | Melting point (° C.) | Ten-point average roughness Rz ($\mu$m) | Number of peeled end-faces (n = 1500) |
|---|---|---|---|---|---|---|
| Example | 21 | Stearic acid | 0.2 | 70.5 | 1.52 | 0 |
| | 22 | Stearic acid | 0.2 | 70.5 | 1.53 | 0 |
| | 23 | Stearic acid | 0.05 | 70.5 | 1.62 | 0 |
| | 24 | Stearic acid | 1.0 | 70.5 | 1.45 | 0 |
| | 25 | Lauric acid | 0.2 | 44.2 | 1.53 | 0 |
| | 26 | Sebacic acid | 0.2 | 134.0 | 1.55 | 0 |
| | 27 | Stearic acid | 0.03 | 70.5 | 1.63 | 3 |
| | 28 | Stearic acid | 1.2 | 70.5 | 1.46 | 5 |
| Comparative example | 21 | Oleic acid | 0.2 | 13.3 | 1.53 | 70 |
| | 22 | Oleic acid | 0.1 | 13.3 | 1.58 | 90 |
| | 23 | — | — | — | 2.50 | 110 |

As seen in Table 4, no fatty acid was added to the electroconductive paste in Comparative Example 23. The ten-point average roughness Rz was large, i.e., 2.50 $\mu$m. The surface smoothness was low, and moreover, the number of peeled end-faces was large, i.e., 110.

On the other hand, fatty acids were added to the electroconductive paste of Examples 21 to 28 and Comparative Examples 21 and 22. The ten-point average roughnesses Rz were in the range of 1.45 to 1.63 $\mu$m. The surface smoothness was enhanced.

In Comparative Examples 21 and 22, oleic acid having a low melting point, i.e., 13.3° C., which is liquid at ordinary temperature (20° C. to 25° C.), was added to the electroconductive paste. The fatty acid did not become solid in the production process for the electroconductive paste and was not effective in enhancing the adhesive properties. It was shown that, in Comparative Examples 21 and 22, the numbers of peeled end-faces were large, i.e., 70 and 90, respectively.

On the other hand, the fatty acids which are solid at ordinary temperature were added to the electroconductive paste in Examples 21 to 28. The number of peeled end-faces was significantly reduced. Thus, the yield of products can be increased.

In particular, when the ceramic laminates were produced, the fatty acids became liquid and dissolved into the ceramic green sheets in Examples 21 to 25, 27 and 28. Thereafter, the fatty acids became solid at ordinary temperature. As a result, the bonding force was increased, and the number of peeled end faces was significantly reduced. Thus, the yield of products can be enhanced.

In Example 26, the sebacic acid, having a high melting point, i.e., 134.0° C., stayed in the solid state when the ceramic laminate was produced. When the laminated ceramic green sheets were pressed to be bonded to each other, plastic deformation occurred, which caused high adhesion between the electroconductive paste and the ceramic green sheets. Thereby, the bonding between the ceramic green sheets and the internal electrode layers was increased. Thus, the number of peeled end faces could be reduced. The yield of products can be increased.

In particular, the contents of the fatty acids were in the range of 0.05 to 1.0% by weight in Examples 21 to 26. This was significantly effective in preventing the end faces from being peeled.

What is claimed is:

1. Electroconductive paste for forming an electroconductive pattern on a ceramic piece comprising ceramic and a ceramic binder resin, the paste comprising:
   electroconductive powder;
   a paste binder resin which is different from the ceramic binder resin; and
   three different solvents,
   the first solvent being a cyclic compound capable of dissolving the paste binder resin, the second solvent being an aliphatic hydrocarbon which is a non-solvent for the ceramic binder resin, and the third solvent being an aromatic hydrocarbon which is a non-solvent for the ceramic binder resin.

2. Electroconductive paste according to claim 1, further comprising a fatty acid which is solid at room temperature.

3. Electroconductive paste according to claim 2, wherein the fatty acid is at least one member of the group consisting of stearic acid, lauric acid, myristic acid, palmitic acid, behenic acid, benzoic acid and sebacic acid.

4. Electroconductive paste according to claim 1, wherein the paste binder comprises a cellulose derivative.

5. Electroconductive paste according to claim 4, wherein the cellulose derivative is a cellulose ether, cellulose ester, or mixture thereof.

6. Electroconductive paste according to claim 5, wherein the cellulose ether is at least one member of the group consisting of ethyl cellulose, carboxymethyl cellulose, hydroxyethyl cellulose, hydroxypropyl cellulose, methyl cellulose, methyl hydroxyethyl cellulose and carboxymethyl ethyl cellulose.

7. Electroconductive paste according to claim 5, wherein the cellulose ester is at least one member of the group consisting of cellulose acetate and cellulose acetobutyrate.

8. Electroconductive paste according to claim 1, wherein the ceramic binder resin is at least one member of the group consisting of polyvinylacetate resin, acrylic resin, and butyral type resin.

9. Electroconductive paste according to claim 1, wherein the paste binder resin is an ethyl cellulose resin, and the second binder resin is a butyral resin.

10. Electroconductive paste according to claim 1, wherein the amounts of solvents are about 30 to 70% by weight of the first solvent, about 10 to 60% by weight of the second solvent, and about 1 to 20% by weight of the third solvent.

11. Electroconductive paste according to claim 10, wherein the paste binder resin comprises a cellulose derivative, and the ceramic binder resin is at least one member of the group consisting of polyvinylacetate resin, acrylic resin, and butyral type resin.

12. Electroconductive paste according to claim 1, wherein the first solvent is at least one member of the group consisting of dihydroterpineol, dihydroterpinyl acetate, and terpineol.

13. Electroconductive paste according to claim 1, wherein the second solvent is a mineral oil having about 7 to 20 carbon atoms.

14. Electroconductive paste according to claim 1, wherein the third solvent is at least one member of the group consisting of methyl decalin, amyl benzene, and isopropyl benzene.

15. Electroconductive paste according to claim 14, wherein the first solvent is at least one member of the group consisting of dihydroterpineol, dihydroterpinyl acetate, and terpineol, and wherein the second solvent is a mineral oil having about 7 to 20 carbon atoms.

16. Electroconductive paste for forming an electroconductive pattern on a ceramic piece comprising ceramic and a ceramic binder resin, the paste comprising electroconductive powder and a vehicle; wherein
   the vehicle comprises a paste binder resin which is different from the ceramic binder resin and three different solvents,
   the first solvent being at least one member of the group consisting of dihydroterpineol, dihydroterpinyl acetate, and terpineol;
   the second solvent being a mineral oil having about 7 to 20 carbon atoms;
   the third solvent being at least one member of the group consisting of methyl decalin, amyl benzene, and isopropyl benzene;
   the amounts of solvents are about 30 to 70% by weight of the first solvent, about 10 to 60% by weight of the second solvent, and about 1 to 20% by weight of the third solvent;
   the weight ratio of vehicle to electroconductive powder is about 20:80 to 90:10; and
   the weight ratio of paste binder to solvents in the vehicle is about 1:99 to 50:50.

17. Electroconductive paste according to claim 16, wherein the first binder comprises a cellulose derivative, and the ceramic binder resin is at least one member of the group consisting of polyvinylacetate resin, acrylic resin, and butyral type resin.

18. Electroconductive paste according to claim 17, further comprising about 0.05 to 1 weight percent of a fatty acid which is solid at room temperature.

19. Electroconductive paste according to claim 18, wherein the fatty acid is at least one member of the group consisting of stearic acid, lauric acid, myristic acid, palmitic acid, behenic acid, benzoic acid and sebacic acid; the paste binder is at least one member of the group consisting of ethyl cellulose, carboxymethyl cellulose, hydroxyethyl cellulose, hydroxypropyl cellulose, methyl cellulose, methyl hydroxyethyl cellulose, carboxymethyl ethyl cellulose, cellulose acetate and cellulose acetobutyrate; and the ceramic binder is at least one member of the group consisting of polyvinylacetate resin, acrylic resin, and butyral type resin.

20. A method of producing electroconductive paste which contains electroconductive powder, a paste binder resin, and three different solvents, and adapted to form an electroconductive pattern on a ceramic piece comprising ceramic and ceramic binder resin, the paste and binder resins being different, comprising the steps of:
   providing a first solvent which is a cyclic compound capable of dissolving the paste binder resin, a second solvent which is an aliphatic hydrocarbon solvent which is a non-solvent for the ceramic binder resin, and a third solvent which is an aromatic hydrocarbon solvent which is a non-solvent for the ceramic binder resin;

mixing the first solvent, the second solvent, and the third solvent to produce a mixed solvent;

mixing an electroconductive powder, the paste binder resin, the mixed solvent, and a dilution solvent to produce slurry with a viscosity of not more than about 10 mPa·s; and removing the dilution solvent from the slurry.

* * * * *